United States Patent Office 2,893,354
Patented July 7, 1959

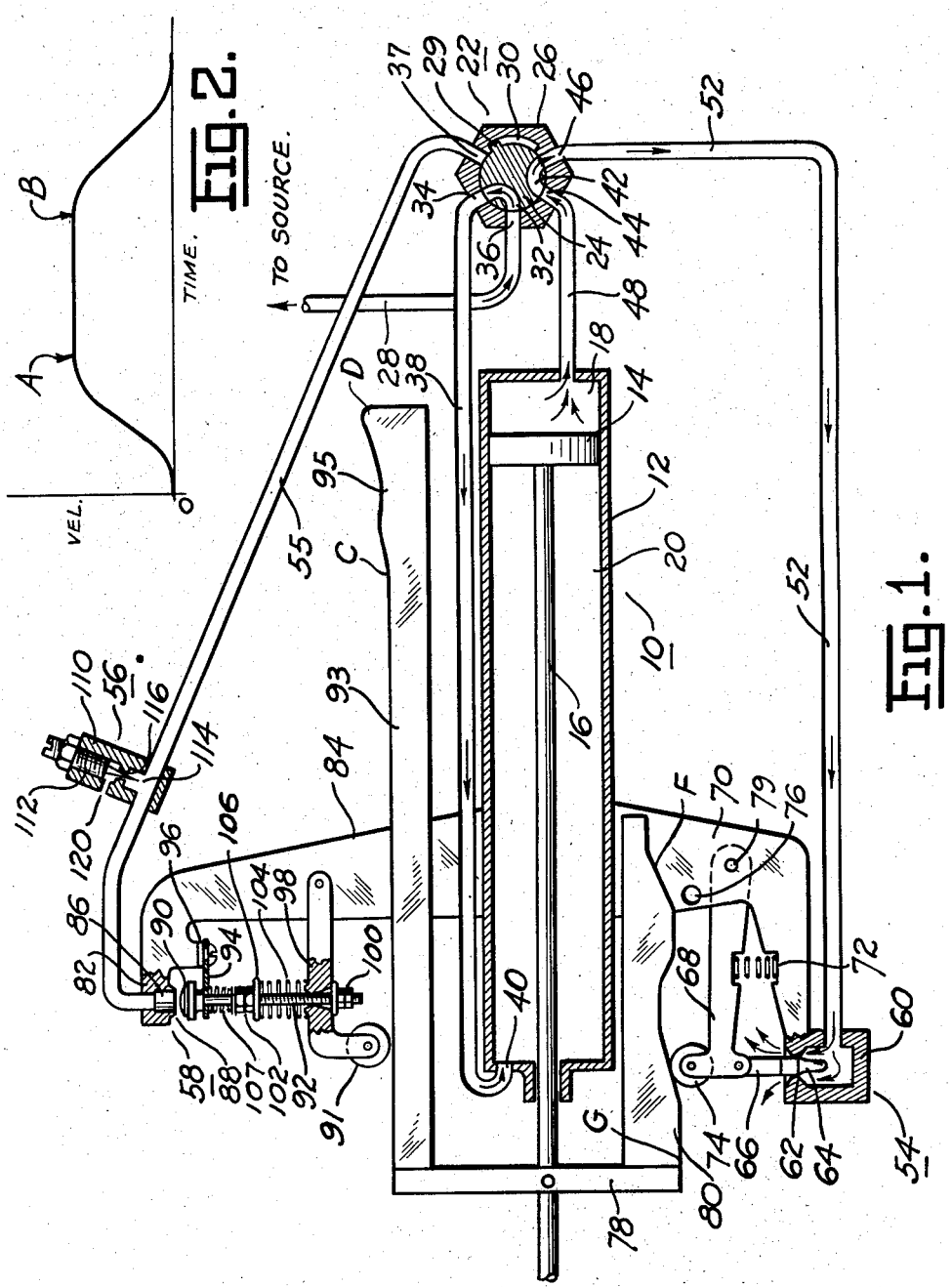

2,893,354

FLUID PRESSURE MOTOR

Leonard E. Austin and John H. Ettinger, South Bend, Ind., assignors to Bendix Aviation Corporation, South Bend, Ind., a corporation of Delaware Application September 27, 1955, Serial No. 536,909

2 Claims. (Cl. 121—38)

This invention relates in general to a device for controlling the movement of a work piece such as a part of an automotive brake being combined, in an assembly mechanism, with other brake parts to complete the brake unit; and in particular this invention relates to a device for controlling either the acceleration or deceleration of said work piece as it is being worked upon. The so-called work piece being moved is, of course, mounted in a clamp or other housing and the device constituting our invention serves to control the movement of the two.

In a brake assembly machine, it is desirable at times to move a brake part or other load from one position to another in a plurality of stages and it is an object of our invention to provide a device for moving a load a certain distance in a relatively short period of time all but the last stage of said movement being relatively quickly effected and the last or decelerating stage of said movement also being relatively quickly and smoothly effected to avoid subjecting the brake part to an undesirable shock.

It is a further object of our invention to provide means for controlling the movement of a mass, said means including a double acting, double ended pressure differential operated motor, the pressure exerted by the power fluid within said motor being controlled in part by cam operated valve means.

Yet another object of our invention is to provide a double acting fluid pressure motor controlled by a plurality of valves one of the same being controlled by means actuated by the power element of the motor and operative as a function of its position and another of said valves being controlled by means operative as a function of the force exerted by said power element.

Yet another object of our invention is to provide a double acting pressure differential operated motor the power element thereof being moved in a plurality of stages, said stages of movement being controlled by valves which are in turn controlled in part by cams actuated by the power element of the motor.

A further object of our invention is to provide a compact and effective load controlling pressure differential operated motor well suited for installation in mechanisms such as a brake assembly machine.

A further object of our invention is to provide a fluid pressure motor operable to move a load a relatively short distance in a relatively short period of time without subjecting the load to a severe and damaging shock; that is a shock which would result from subjecting the load to a relatively high acceleration or a relatively high deceleration.

Other objects of the invention and desirable details of construction of parts will become apparent from the following detailed description of an illustrative embodiment of the invention, taken in conjunction with the accompanying drawing illustrating said embodiment in which:

Figure 1 is a view, largely in section, disclosing the details of the load controlling fluid pressure operated motor and its control means constituting our invention; and Figure 2 is a velocity, time graph indicating the movement of the load controlled by the device of Figure 1.

Referring now to Figure 1, disclosing a preferred embodiment of our invention, a fluid pressure operated motor, indicated by the reference numeral 10, includes a double ended tubular casing 12 housing a piston 14 reciprocable therein. This piston, that is power element of the motor, is connected to a load, not shown, by a rod 16. The load may, for example, be a part of a brake secured to a clamp said part to be combined with other brake parts to make up an automotive brake unit. In a mechanism for assembling the parts of such a unit it is often desirable, in the interests of minimizing the time required to assemble the unit, to move a load a relatively short distance in a relatively short period of time without, however, subjecting the load to damaging shocks; and our invention is designed to effect this end.

The mode of movement of the piston 14, and therefore the mode of movement of the load, is controlled by controlling the forces acting upon said piston during its power stroke to the right and its power stroke to the left, Figure 1. The force acting upon the piston tending to move it to the left from the position disclosed in Figure 1 is the force exerted by the power fluid in a chamber 18 of the motor; and the forces opposing this force, and effective to maintain for a certain time a constant or substantially constant velocity of the piston once it has reached the desired velocity and to then decelerate the piston are, in a large measure, the forces exerted by the power fluid in a chamber 20 of the motor. When the piston and its connected load is moved to the right, Figure 1, the controlling effect of the fluid pressures in the chambers 18 and 20 is the reversal of the aforementioned control; for then the gaseous pressure in the chamber 20 determines the force tending to effect a movement of the piston and its connected load to the right; and the gaseous pressure in the chamber 18 in large measure determines the force controlling the mode of movement of the piston in this direction once its movement has been initiated by the force exerted by the air within the chamber 20.

Describing now the means for controlling the gaseous pressures within the chambers 18 and 20, a 4-way valve 22, preferably power actuated, admits fluid, preferably air, into one or the other of said chambers. To effect this end a rotatable cylindrically shaped valve member 24, housed within a casing 26, is rotated counterclockwise to the position disclosed in Figure 1 to connect the compartment 20 with a conduit 28 leading to a source of air under pressure, not shown; and when the member 24 is rotated clockwise from the position disclosed in Figure 1 the conduit 28 is connected to the compartment 18 of the motor. A stop 29, secured to the member 27 and movable within a recess 30 in the valve casing 26, serves to limit this rotational movement of the valve 24. Describing in greater detail the operation and structure of the valve 22 when the stop 29 abuts the casing 26 at 31, a U-shaped duct 32 in the member 24 registers with ports 34 and 36 in the valve casing. The conduit 28 is connected to the port 36 and a conduit 38 is connected at one of its ends to the port 34 and at its other end with a port 40 in the motor casing, the latter port registering with the motor chamber 20 and when the valve member 24 is moved to the position disclosed in Figure 1, a U-shaped duct 42 in said member serves, via a conduit 48 and a conduit 52, to interconnect the compartment 18 with a rate of flow control valve 54. In this operation of venting the air in the chamber 18 with the atmosphere, ports 44 and 46 in the valve casing serve, respectively, to interconnect the conduit 48 with the duct 42 and the conduit 52 with said duct.

As to the operation of the valve 22 to place the chamber 18 in communication with the source of air pressure and at the same time to vent the chamber 18 to the atmosphere, when the valve member 24 is rotated from the position disclosed in Figure 1, the duct 42 in the valve member 24 registers with the ports 36 and 44 in the valve casing to connect the chamber 18 to the source of pressure; and this operation of the valve results, by the registering of the duct 32 with the ports 34 and a port 37, in the venting of the chamber 20 to the atmosphere via a needle type bleed valve 56 mounted in a conduit 55, and a flow control valve 58 mounted at the end of said conduit.

Describing now the so-called flow control valve 54, this valve, which is actuated by means connected to the piston 14 and is operable as a function of the position of said piston, includes a hollow cup like casing 60 having an opening 62. That portion of the valve casing outlining the opening 62, together with the tapered end portion 64 of a plunger 66, constitute a bleed valve for controlling the rate of flow of air coming from the chamber 18. The size of the opening 62 is progressively decreased as the tapered valve portion 64 is moved into said opening. The plunger 66 is preferably pivotally connected to a valve operating lever member 68 which is pivotally connected at 79 to a bracket 70 secured to the motor casing 12. A spring 72, seated within recesses in the lever 68 and bracket 70, serves to bias a roller 74, mounted on the lever, into contact with a stop 76 mounted on said bracket. To the piston rod 16 there is secured a yoke 78 having secured to one of its ends a cam 80 the lower side of which, Figure 1, is irregularly shaped as desired. Movement of the piston 14 to the right results in this irregularly shaped side portion coming into contact with the roller 74 to move the valve member 64 into the valve opening 62 to control the size of the opening to thereby control the rate of efflux of air from the motor chamber 18.

Describing now the valve 58, which is actuated by means interconnecting the piston 14 and valve and operable as a function of the force exerted by the piston, said valve includes a member 82 constituting the end portion of a bracket 84, said member having a port 86 therein registering with the end of the conduit 55. That portion of the valve member 82 outlining the port 86 provides a seat 88 which is contacted by a pressure sensitive valve member 90 preferably having a rounded end portion. The valve member 90 has a stem 92 extending through a guide 94 which is adjustably secured to the bracket 84. One or more washers 96 in the connecting means interconnecting the guide and bracket serve to determine the open position of the valve disclosed in Figure 1.

The valve stem 92 extends through an opening in a lever arm 98 which is pivotally connected at one of its ends to the bracket 84; and nuts 102 threadedly mounted on the stem serve to determine the load of a spring 104 sleeved over the stem and positioned between the arm 98 and a washer 106 abutting the nuts 102. A roller 91 is mounted on the end of the arm 98 and is positioned above a cam 93 secured to the yoke 78; and the position of this roller with respect to said cam is determined by nuts 100 threadedly mounted on the stem 92. The cam 93 is provided with an irregularly shaped face portion 95. A return spring 107, weaker than the spring 104 and interposed between the guide 94 and the nuts 102, serves to bias the valve 90, nuts 102 and 100, spring 104 and arm 98 as a unit downwardly.

The needle valve 56 includes a casing 110 threadedly receiving a valve member 112 having a tapered end portion 114. This end portion, depending upon the adjustment of the valve member 112, controls the size of the opening between the tapered portion 114 and a port 116 in the valve body, the air passing through the opening flowing out of the valve through a port 120.

Describing now the complete operation of the mechanism of our invention, to move the piston 14 and its connected load to the left from the position of the piston disclosed in Figure 1, the 4-way valve 22 will, as previously described, be set to connect the motor compartment 18 to the source of air under pressure, and connect the motor compartment 20 with the needle valve 56 and the then open valve 58. The air in the vented compartment 20 will then quickly approach atmospheric pressure and the pressure in the compartment 18 will be quickly brought up to the pressure of the source of air pressure to which the conduit 28 is connected. Then the piston and its connected load will, as soon the the differential of pressures acting on the piston is great enough, be accelerated to the left as indicated by the time, velocity graph disclosed in Figure 2 of the drawings. At some time thereafter, the forces acting on the piston will be balanced whereupon, as indicated by the graph of Figure 2, the velocity of movement of the load will be held constant or substantially constant during another stage of travel of said load; for during the latter stage of operation of the mechanism the roller 91 is neither raised nor lowered by the cam 93, the valve 58 with its pressure sensitive member 90 remaining fully open.

Describing the last stage of operation of the mechanism, the load is, at point B on the graph, traveling at a relatively high velocity and at this point said load is nearing the end of its stroke. It is accordingly necessary, to avoid undue shock to the load, to control its deceleration as it approaches the end of its stroke. This is effected by the operation of the valve 58; for when the cam 93 has moved to a point where the roller 91 contacts an incline C on the cam the roller is forced upwardly to first compress the return spring 107 and by the bodily movement of the valve member 90, seat said member upon the seat 88 and then further compress spring 104. The air in the conduit 55 is, by this operation, bottled up save for the fixed relatively small leak through the valve 56; and when the gaseous pressure in said conduit and the compartment 20 reaches a certain value the pressure sensitive valve member 90 is moved away from its seat 88 and in so doing overcomes the spring 104 which is compressed by this operation. Explaining this operation the pressure of air in the port 86 acting upon the head of the valve member 90 is, of course, the same as the air pressure in the conduit 55 and the compartment 20 the latter pressures being the same. The resistance offered by the spring 104 is controlled by the adjustment of the nuts 102.

The increased air pressure in the compartment 20 results in a change in the differential of pressures acting upon the motor piston and the result is a force acting to the right, Figure 1, to initiate a deceleration of the load, as indicated by point B on the graph. As indicated by the right end portion of the graph, this deceleration is then varied for the large part of the remainder of the stroke of the load said variation being effected by shaping the cam face from the point C on cam portion 95 on to its end at D; for the contour of the cam in the area C—D determines the vertical component of the force exerted by the cam face on the roller; and this vertical component determines the degree of compression of the spring 104 which is in series in the connection between the roller 91 and the valve member 90. After the piston and its load have completed their stroke the valve 56 functions to bleed conduits 38 and 55 so that the gaseous pressure in chamber 20 is reduced to atmospheric thereby effecting a maximum differential of pressures acting upon the piston 14.

It is apparent therefore, from the previous description and an examination of the figures of the drawing that the leftward mode of movement of the load is controlled by several factors including the shape of the cam 93, the loading of the spring 104 by the adjustment of the nuts 102 and operation of the cam, and the adjustable open position of the valve 58.

The rightward mode of movement of the load is in large measure controlled by the operation of the valve 54 said movement being initiated by the operation of the 4-way valve 22. As with the above described leftward movement of the load the rightward movement is determined by controlling the differential of pressure acting on the piston 14; and this differential is, in large measure, controlled by the rate of efflux of air from the valve 54. Briefly describing this operation, when the piston is at its at rest position preparatory to moving to the right, the arm 68 is biased into contact with the stop 76 and the valve 54 is fully open. Then at the end of the above described constant velocity stage of movement of the piston and its load, that is at point B on the graph, an inclined portion F on the cam contacts the roller 74. The tapered valve portion 64 then enters the opening 62 and thereafter for the remainder of the stroke the rate of efflux of air, and the consequent deceleration of the load, is controlled by the shape of the cam in its area F—G, Figure 1.

There is thus provided, by the double acting pressure differential operated motor of our invention, a relatively simple and effective mechanism for controlling the mode of movement of a load in the desired direction as described above, said movement being effected in a plurality of stages in a relatively short period of time there being, in the stroke of movement of the load, no deceleration factor amounting to a shock which would damage said load. The mechanism disclosed in Figure 1 controls the deceleration of the load, however, the cams 80 and 93 may be shaped to also control the acceleration thereof.

Although only one embodiment of the invention has been illustrated and described, various changes in the form and relative arrangements of the parts may be made to suit requirements.

We claim:

1. A motor mechanism for controlling the movement of a load in a plurality of directions said mechanism including a double acting pressure differential operated motor comprising a cylinder and a power element therein, means connected with the power element and adapted to be connected to the load the movement of which is to be controlled, and means for controlling the operation of the motor including a fourway valve for venting the motor and controlling the influx of power fluid into the motor to impose a force upon its power element thereby determining the direction of movement of the load to be moved, and further including other means, including a pressure sensitive valve member controlled in part by a cam member connected with the power element, for controlling the rate of efflux of power fluid from either end of the motor and thereby control the mode of movement of the load as it is moved from one place to another.

2. A motor mechanism for controlling the movement of a load in a plurality of directions said mechanism including a double acting pressure differential operated motor comprising a cylinder and a power element therein, means connected with the power element and adapted to be connected to the load the movement of which is to be controlled, and means for controlling the operation of the motor including a valve for controlling the influx of power fluid into the motor to impose a force upon the power element and to determine the direction of movement of the load, and further including a power element actuated yieldable means and, in series therewith, a power element actuated bodily movable pressure sensitive valve means for controlling the rate of efflux of power fluid from either end of the motor and thereby control the mode of movement of the load as it is moved from one place to another; together with adjustable means, acting upon the yieldable means, for varying the control operation of the pressure sensitive valve means.

References Cited in the file of this patent

UNITED STATES PATENTS

| | | |
|---|---|---|
| 840,877 | Steedman | Jan. 8, 1907 |
| 967,565 | Rohan | Aug. 16, 1910 |
| 1,431,248 | Norris | Oct. 10, 1922 |
| 1,604,548 | Dapron | Oct. 26, 1926 |
| 1,812,533 | Hunt | June 30, 1931 |
| 2,164,876 | Horlacher | July 4, 1939 |
| 2,392,074 | Wasson | Jan. 1, 1946 |
| 2,442,635 | Bennett | June 1, 1948 |
| 2,458,290 | Munroe | Jan. 4, 1949 |
| 2,616,398 | Emrick | Nov. 4, 1952 |